Figure 1:
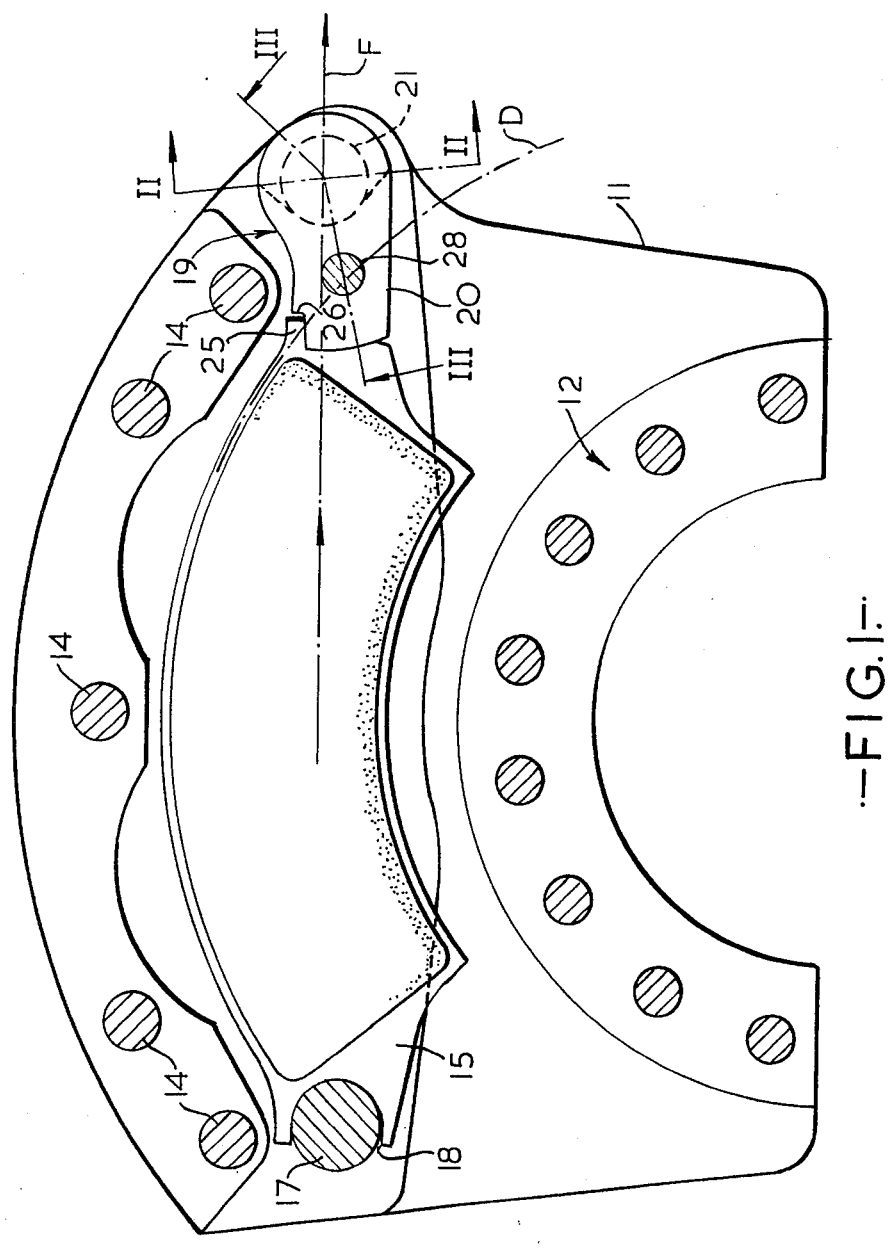

United States Patent [19]

Edwards

[11] 4,139,082

[45] Feb. 13, 1979

[54] DISC BRAKE STRUCTURE PERMITTING QUICK CHANGE OF FRICTION PADS

[75] Inventor: Roy E. Edwards, Warley, England

[73] Assignee: Girling Limited, Birmingham, England

[21] Appl. No.: 664,695

[22] Filed: Mar. 8, 1976

[30] Foreign Application Priority Data

Mar. 21, 1975 [GB] United Kingdom ............ 11810/75

[51] Int. Cl.² ............................................. F16D 65/02
[52] U.S. Cl. .............................. 188/73.6; 192/70.13
[58] Field of Search ................... 188/73.6; 192/70.13

[56] References Cited

U.S. PATENT DOCUMENTS

| 2,921,650 | 1/1960 | Butler | 188/73.6 |
| 3,357,524 | 12/1967 | Smith | 188/73.6 |

FOREIGN PATENT DOCUMENTS

| 1267560 | 5/1968 | Fed. Rep. of Germany | 188/73.6 |
| 2236420 | 2/1973 | Fed. Rep. of Germany | 188/73.6 |

*Primary Examiner*—George E. A. Halvosa
*Attorney, Agent, or Firm*—Scrivener, Parker, Scrivener and Clarke

[57] ABSTRACT

In a spot-type disc brake the pads are insertable in a substantially peripheral direction through openings in an end of the brake. In service the openings are blocked by a closure member which has to block the two openings two limbs each extending through the openings to engage the pads. The member is pivotal about an axis parallel to the rotational axis of the brake's disc and disposed outside the disc's periphery. The brake's caliper is made in two halves bolted together and has blind journals receiving trunnions integral with the member. The drag force tends to act along the limbs so that the drag force is taken substantially entirely by the trunnions.

6 Claims, 4 Drawing Figures

DISC BRAKE STRUCTURE PERMITTING QUICK CHANGE OF FRICTION PADS

The present invention concerns disc brakes.

There have been many proposals relating to the means for enabling pads to be replaced. None of these have been wholly satisfactory. It is the aim of the present invention to suggest a new approach which can be developed to overcome most of the disadvantages of the prior constructions.

According to one aspect of the present invention, there is provided a spot-type disc brake wherein each brake pad is insertable into a caliper through an opening in one peripheral end of the caliper and wherein a closure member for each opening is pivoted about an axis extending parallel to the axis of the brake's disc for movement between a position allowing passage of the pad through the opening and a position in which it is locked to prevent peripheral movement of the pad.

If the pivot axis is outside the disc periphery and if the closure member is in the form of a limb which in the passage allowing position extends along the rim of the disc (which allows optimum access both to the closure member and to the pad), the limb in the closing position can project to within the caliper; this eliminates the need for the pad backing plate fully occupying the caliper, which may have to be large for its own strength requirements, and allows the pad backing plate to be small and merely sufficient for its own needs; this gives economic benefits and allows the pad to be more easily manipulated. The end profile of the limb can have an area substantially perpendicular to a line joining that area to the pivotal axis and have a stop co-operating with a stop on the end of the pad so that the end profile of the limb abuts the end of the pad with a projection and recess type of engagement. The pad and the limb thus form an articulated beam between a support for the leading end of the pad during insertion and the pivotal axis. This beam can be kept in line by a light-duty locking means so that the pad cannot move radially inwardly or outwardly. The locking means can be light duty since the drag forces tend to act along the beam with only small forces tending to buckle the beam; in fact if the drag force acts along a line passing through the said area and the pivotal axis, there will be no or little force on the locking means due to the drag force.

The two limbs can be integral with each other and be locked by a common locking means such as a captive bolt engaging one limb. Since the locking forces are light, this does not impose large stresses throughout the integral closure member. The integrity of the closure member means it is more easily manipulatable and there is no need to remove the road wheel of the vehicle to gain access. If the caliper is made in two halves bolted or otherwise joined on a plane substantially parallel to the plane of the disc, trunnions integral with the integral closure member can be inserted into blind journals in the halves together with seals as the halves are being joined. Thus the closure member cannot become detached in service and a hazard is avoided. Only two seals are needed and any tendency to seizure is minimised very reliably and inexpensively.

It is possible to incorporate an abutment within the caliper for taking part of the drag load but such an abutment means the pad has to be manoeuvred round the abutment during insertion and removal.

It will be appreciated that embodiments of the present invention need no pins to mount the pads and thus there is no pin to seize in a hole provided for it, no pin to be lost, and no difficulty in inserting pins in holes. The closure member in its passage allowing position lies within the space between the road wheel and the disc, which space has to be provided for the bridge of the caliper in any event, and is easily accessible, so that it is not necessary to remove the road wheel for pad replacement or to have a large gap between the disc and the road wheel, as is necessary if the pads are insertable radially. There are no loose parts to be lost during servicing.

Embodiments of the present invention will now be described by way of example with reference to the accompanying drawings.

IN THE DRAWINGS

Figure 2:
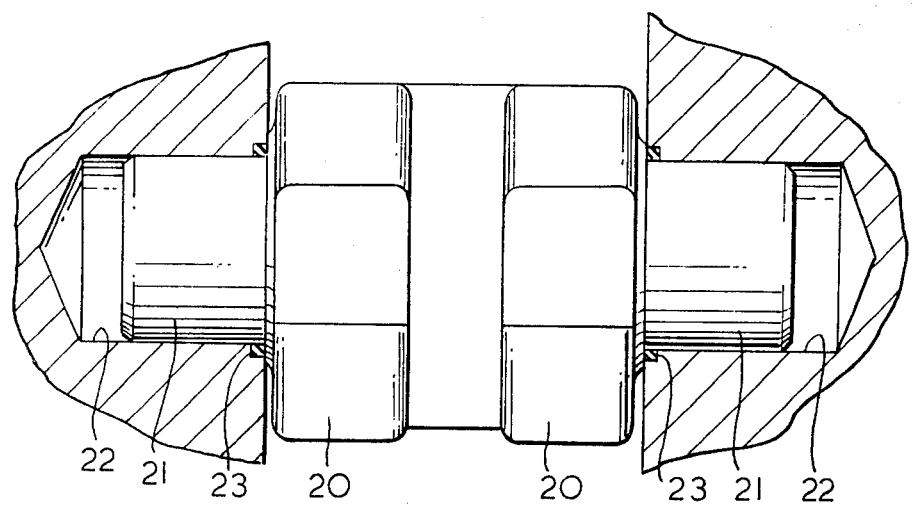
Figure 3:
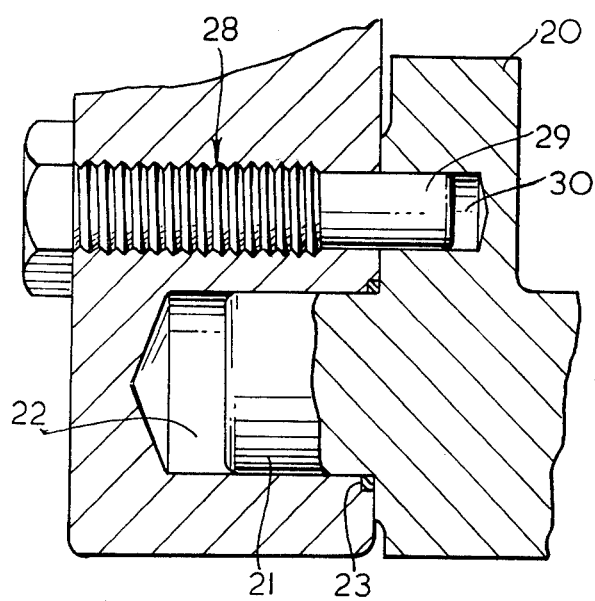
Figure 4:
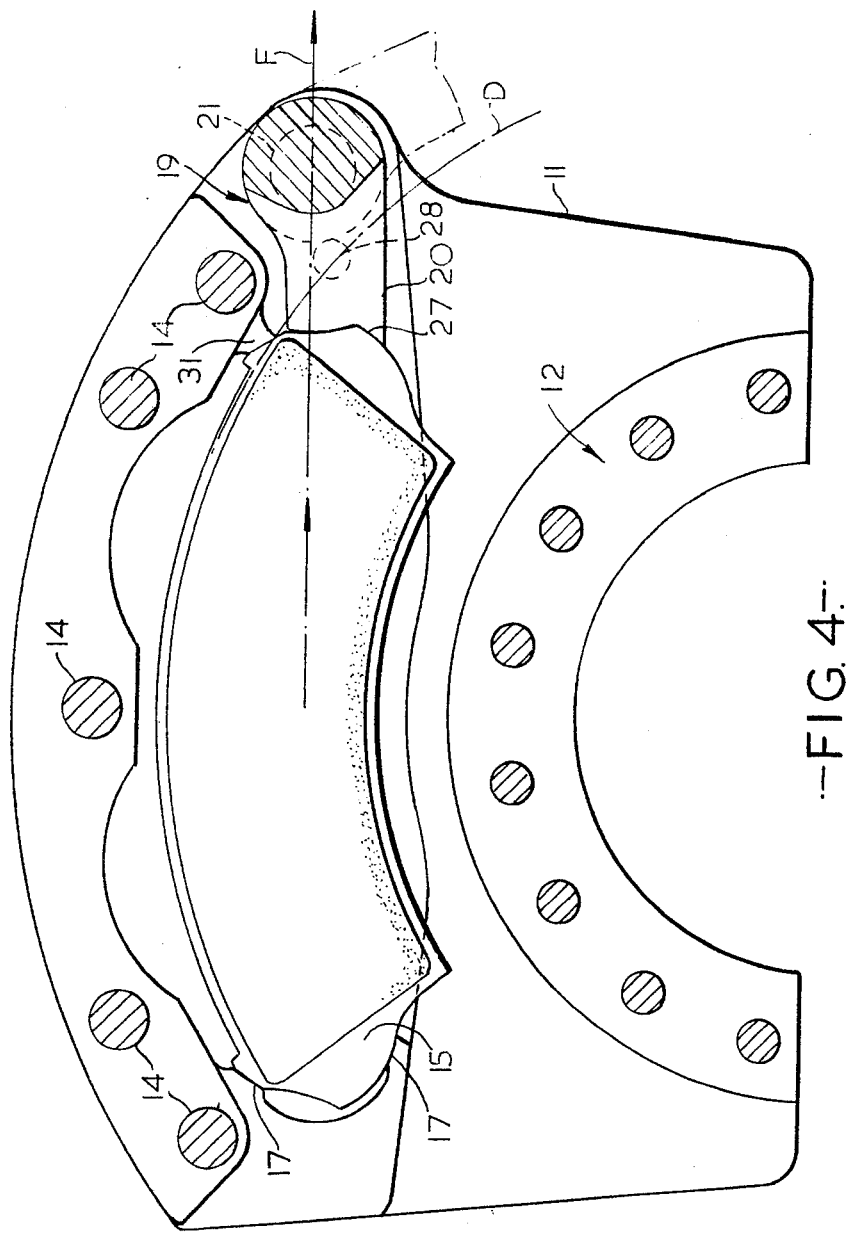

FIG. 1 is a section taken in a plane parallel to that of brake disc of a disc brake according to the invention, FIG. 2 is a section on line II — II of FIG. 1, FIG. 3 is a section on line III — III of FIG. 1, and FIG. 4 is a section similar to that of FIG. 1 but of a second embodiment.

In FIG. 1, a fixed caliper of a hydraulically operated spot-type disc brake is made in two halves, of which one part is shown in FIG. 1 as 11 and has mounting means 12. Apart from the mounting means which is provided on only one of the halves, the two halves are substantially identical and abut each other substantially in the plane of the brake disc (not shown) being held together by bolts 14. Each half contains a pair of hydraulic pistons and cylinders arranged to urge a brake pad 15 against the disc. The caliper halves have openings at one end for the insertion and removal of the brake pads, one opening on each side of the disc for the insertion of a respective pad, even in the presence of the disc.

The pads are inserted in a peripheral movement until their leading ends abut stops 17 which can be pins. Each pad might have a slot 18 in its leading end which engages on the pin-like stop 17. The pad is then rendered captive by a closure member 19 which takes the drag-loading of the pad and prevents peripheral movement of the pad in one of the two senses of disc rotation.

The major difference between the embodiments of FIGS. 1 and 4 lies in the use of non-handed pads in FIG. 4. This entails the use of a different form of fixed stop 17 and a slight difference in the closure member.

The construction of the closure member 19 for each of the illustrated embodiments can be seen either from FIG. 1 or FIG. 4, each taken in conjunction with FIGS. 2 and 3. The closure member 19 is an integral member having two limbs 20 each acting as a closure for a respective pad opening. It has two trunnions 21 fitting into blind journals 22 in the caliper halves. The trunnions are of course co-axial and are inserted in the journals together with the fitting of seals 23 when the caliper halves are joined together. These journals define a pivotal axis for the closure member parallel to the disc's rotational axis and outside the disc's periphery D. The closure member can pivot about this axis between a position wherein the limbs lie in the space between the disc and the road wheel, which space is the clearance needed for the caliper's bridge, and extend substantially peripherally, thereby allowing insertion and removal of the pads, and a position rendering the pads captive. The two limbs of the closure member swing inside the caliper in their second position into co-operative abutment with the pads. The end profile of the limb, both in FIG. 1 and FIG. 4, comprises an arc of a circle drawn about the pivot axis. In FIG. 1, the end profile of the pad has a stop part 25 and the end profile of the limb an optional cut-away 26; in FIG. 4, the end profile of the limb has a stop portion 27 and the end of the pad is correspondingly profiled. The stop part 25 or the stop portion 27 forms a recess so the pad and limb are engaged with a projection and recess connection and thus form a beam-like linkage between the stop 17 and the pivot axis. This linkage is prevented from buckling by a locking means 28 which can comprise a captive bolt 29 in the caliper which projects into a hole 30 in one of the limbs. The shape of the abutting end profiles is such that the linkage prevented from buckling the pad is restrained against radial movement inwardly or outwardly. The drag force F will tend to act along this beam-like linkage and the bolt 29 will not be subjected to heavy stresses. If in fact the drag force F effectively passes through the pivotal axis and an area on the end profile, which area is substantially perpendicular to the line joining that area to the pivotal axis and therefore perpendicular to the drag force, the drag force causes no strain on the bolt and is taken solely by the trunnions. This condition of the area being perpendicular is of course met if the area is part of the arc. The bolt can be arranged with some play so that it merely locks the member in the absence of major forces but, when there are major stresses such as drag forces, these are isolated from the bolt by means of the play. FIG. 4 also illustrates that an internal abutment 31 can be used to assist in taking drag forces. The use of such an abutment means the pad has to be manoeuvred round the abutment for insertion and removal.

A pivotal closure can be used instead of the fixed stops 17.

I claim:

1. A spot-type disc brake comprising a disc, a caliper straddling part of the disc's periphery, a pad on each side of the disc within the caliper, means within the caliper for urging the two pads to engage the disc, the caliper having an opening for the insertion of each pad so disposed at the end of the caliper that the pad is inserted and withdrawn in a peripheral direction, a closure member having two limbs which are pivotal as one about an axis out side the circumference of the disc and parallel to the rotational axis of the disc between a position wherein each limb projects through the respective opening into the caliper to abut the respective pad and render it peripherally immovable and a position allowing the pad to be withdrawn and inserted, each limb having an abutment engaging the pad in a projection-and-recess type engagement and the caliper having an abutment engaging the far end of the pad whereby the pad in use is supported between two complementary abutments, the geometry being such that the pad and the limb forms a beam-like linkage between the caliper's abutment and the pivotal axis constructed and arranged to prevent buckling of said beam-like linkage, and a locking means engageable with one limb to hold both limbs in the first-mentioned position to support each said linkage against radial movements.

2. A disc brake according to claim 1 wherein the pivotal axis is disposed substantially on the line of action of the drag force and wherein the area of the closure member through which the drag force passes is substantially at right angles to a line joining the area to the pivotal axis.

3. A disc brake according to claim 1 wherein the locking means is a bolt extending from the caliper into a hole in one of the limbs.

4. A disc brake according to claim 3 wherein the bolt is captive in the caliper.

5. A spot-type disc brake wherein each brake pad is insertable into a caliper through an opening in one peripheral end of the caliper and wherein a closure member has two limbs pivotal as one about an axis defined by trunnions integral with the closure member which engage with seals in blind journals in the caliper which is made in two halves joined together on a plane parallel to that of the disc, the axis being parallel to the rotational axis of the disc, between a position wherein each limb projects through the respective opening to engage the respective pad with a projection and recess type abutment so that the pad forms with the limb a beam-like linkage between a support for the non-closure-member end of the pad and the pivotal axis preventing peripheral movement of the pad and a position allowing passage of the pad through the opening, a locking means being provided to support said linkage against buckling and the arrangement being such that drag forces act along the linkage with the pad being supported against radial movement by the said abutment.

6. A disc brake according to claim 5 wherein the pivotal axis is disposed outside the periphery of the brake's disc.